UNITED STATES PATENT OFFICE.

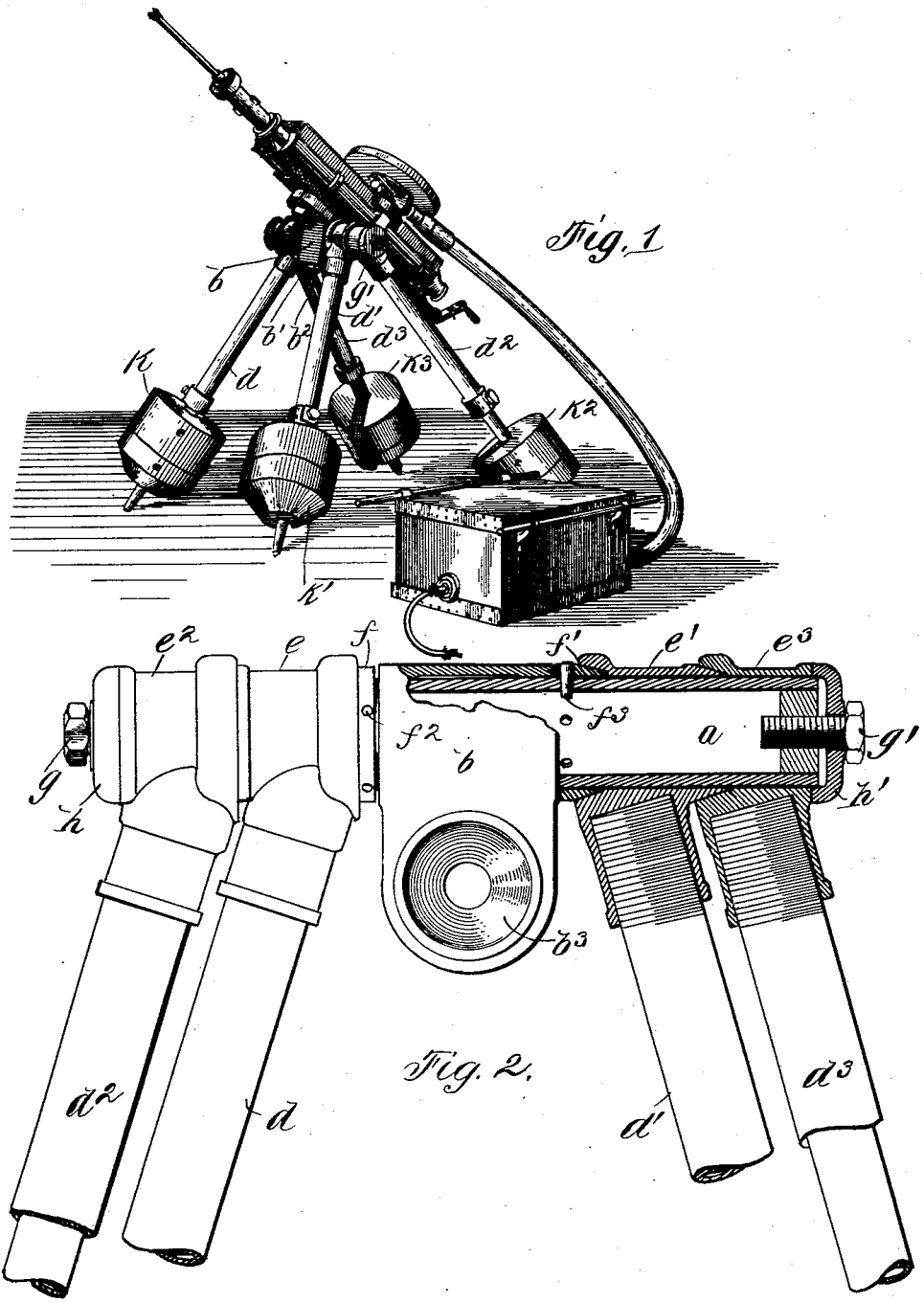

ADOLF EMIL WALDEMAR MEISSNER, OF CHARLOTTENBURG, GERMANY, ASSIGNOR TO THE SIEMENS & HALSKE ELECTRIC COMPANY OF AMERICA, OF CHICAGO, ILLINOIS.

TETRAPOD FOR DRILLS.

SPECIFICATION forming part of Letters Patent No. 573,608, dated December 22, 1896.

Application filed May 2, 1896. Serial No. 589,972. (No model.) Patented in Germany October 3, 1895, No. 85,864.

*To all whom it may concern:*

Be it known that I, ADOLF EMIL WALDEMAR MEISSNER, a subject of the Emperor of Germany, residing at Charlottenburg, Germany, have invented new and useful Improvements in Tetrapods for Drills, (Case No. 70,) of which the following is a specification, and for which Letters Patent have been granted in Germany, No. 85,864, dated October 3, 1895.

My invention relates to an improved tetrapod for drills.

The object of my invention is to provide a support for drills of sufficient strength and solidity for drills of the heavy percussion type, permitting a wide range of drill adjustment after the device has been set in position for work. Heretofore the tripod has been in general use for this purpose, but it has not proven adaptable to drills capable of striking heavy blows, because of insufficient strength and solidity. A drill mounted upon a tripod has also only a limited range of adjustment, and the tripod must be quite frequently moved in order that the varying conditions of the work may be met. These difficulties the device of my present application remedies, permitting a drill of great power to be satisfactorily operated in any direction after the tetrapod has been set.

My device consists of a drill clamp or collar and four legs mounted upon a heavy horizontal shaft on which they are free to revolve, means being provided for rigidly securing all the parts in any position of rotation in which they may be placed.

In the accompanying drawings, Figure 1 is a perspective view of the device as it appears when set in position for work. Fig. 2 is a detailed view of the upper portion of the tetrapod, partially in section.

Like letters refer to like parts throughout the figures.

Referring to the drawings, the shaft $a$ is preferably of tubular construction with solid ends and provided with thick walls to resist the necessarily-heavy strains that are put upon it. At the center of this shaft is axially mounted drill clamp or collar $b$, free to revolve upon the shaft, but may be rigidly secured thereto in any position of rotation by set-screws $b'$ $b^2$. The drill is attached to the clamp $b$ by means of a cone thereon fitting into the conical opening $b^3$, provided in the drill-clamp $b$, with its axis at right angles to the shaft, and is secured to the clamp in any position by means of a set-screw. Thus the drill has movement in one plane upon the cone, fitting in opening $b^3$ as axis, and movement in another plane at right angles thereto upon shaft $a$ as axis.

Four legs $d$ $d'$ $d^2$ $d^3$ are mounted rotatably upon the shaft $a$, two at each end, by means of the collars $e$ $e'$ $e^2$ $e^3$, secured, respectively, at the tops of the legs. The said collars are free to revolve upon the shaft, but are provided with means mentioned below for rigidly securing them in any position of revolution upon the said shaft.

A ring or shoulder $f f'$ is rigidly mounted on either side of the drill-clamp $b$ upon the shaft $a$, being secured to the said shaft by pins or keys $f^2$ $f^3$, inserted in holes provided in the rings and shaft, respectively. The abutting faces of the rings $f f'$ and the collars $e$ $e'$ $e^2$ $e^3$ are of the alternate form of solid and hollow frustums of cones of the same angle and diameter. A cap or washer $h$ $h'$ is provided at each end of the shaft, whose shoulders bear upon the outermost collar. A set-screw $g$ $g'$ at each end bears against the respective cap, operating in a tapped hole provided in the solid end of shaft $a$. When it is desired to lock the legs of the tetrapod in position, these set-screws are tightened, pressing the caps $h$ $h'$ against the adjoining collars $e^2$ $e^3$, which in turn bear upon the next collars $e$ $e'$ and these upon the rigid rings $f$ $f'$. Thus by means of the concentric solid and hollow frustums of cones upon their abutting faces the legs are locked in position.

In practice it has been found that the frustums should be of cones having an acute angle of about thirty degrees in order to secure the best results in locking the parts rigidly in position with but little strain upon the device and its parts and for readily releasing the same when desired.

The legs of the tetrapod are mounted upon the shaft by means of the collars at an obtuse inner angle with the said shaft in order to secure as broad a base as possible when the legs are extended. When set in position, the legs are as heavily weighted as may be desired by adjustable weights $k\ k'\ k^2\ k^3$, &c., placed upon the legs above the shoulders provided therefor. A more advantageous disposition of the weights can thus be made than when a tripod is used.

Having thus described my invention, what I claim as new, and desire to secure by Letters Patent, is—

1. In a support for drills, the combination with the shaft $a$, of a drill-clamp $b$ mounted upon said shaft, means for securing the same in any position of rotation thereon, collars $e\ e'\ e^2\ e^3$ rotatably mounted in pairs upon the said shaft on either side of the drill-clamp, four legs secured to the said collars and adapted to be independently spread to positions of wide divergence forming a quadrilateral base for said drill-support, and independent means for locking each pair of legs and collars in any position of adjustment, substantially as described.

2. In a support for drills, the combination with a horizontal shaft $a$ of a drill-clamp $b$ rotatably mounted upon said shaft, means for securing the same in any position of rotation upon the said shaft, shoulders $f\ f'$ provided upon the said shaft, one on each side of the drill-clamp, four collars $e\ e'\ e^2\ e^3$ rotatably mounted two on each end of the shaft, engaging oblique walls or faces provided upon the said collars, and shoulders in the shape of alternate solid and hollow frustums of cones of the same angle and diameter, four legs $d\ d'\ d^2\ d^3$ secured to the said collars, a cap or washer $h\ h'$ at each end of the said shaft adapted to bear upon the outer face of the adjoining collar, a set-screw $g\ g'$ provided at each end of the shaft adapted to engage the cap thereon and lock the collars in any position of rotation upon the said shaft; substantially as described.

3. In a support for drills, the combination with a drill-clamp rotatably mounted upon a horizontal shaft, of means for securing the same upon the said shaft in any position of rotation thereon, shoulders provided upon the shaft upon each side of the said clamp, two collars axially mounted upon each end of the shaft beyond the said shoulders, said shoulders and collars being provided with engaging oblique walls in the shape of alternate solid and hollow frustums of cones of the same angle and diameter, four legs secured respectively to the four rotatably-mounted collars, and adapted to be independently spread to positions of wider and wider divergence from one another as the said collars are rotated to form a quadrilateral base of increasing dimensions, and means for locking the parts in any position of rotation upon the said shaft; substantially as described.

In testimony whereof I affix my signature in the presence of two witnesses.

ADOLF EMIL WALDEMAR MEISSNER.

Witnesses:
PAUL RAEDIGER,
JULIUS ZINGLER.